Oct. 28, 1952     R. E. MUNGOVAN ET AL     2,615,954
STANDOFF INSULATOR STUD
Filed Aug. 24, 1951

Inventors:
Robert E. Mungovan,
Howard W. Orr,
by Ernest␣Britton
Their Attorney.

Patented Oct. 28, 1952

2,615,954

UNITED STATES PATENT OFFICE 2,615,954

STANDOFF INSULATOR STUD

Robert E. Mungovan and Howard W. Orr, Fort Wayne, Ind., assignors to General Electric Company, a corporation of New York Application August 24, 1951, Serial No. 243,522

2 Claims. (Cl. 174—181)

Our invention relates to insulator studs as articles of manufacture.

Heretofore, it has been known to make a standoff insulating stud (to be used, for example, between a dynamoelectric machine frame and a holder for a contact brush) by joining two threaded metallic parts by means of a high temperature hot molding compound. However, in many applications insulating studs so fabricated do not have sufficient strength and present further problems in that during the hot molding it is very difficult to keep the metallic parts in proper alignment. Further, the hot molding tends to set up stresses and to oxidize plating or other surface finish of the metallic parts and causes further disadvantages in connection with subjecting the plastic compound to shear tensile stresses which are excessive having due regard for the construction and the requirements thereof.

It is an object of the present invention to provide simple and inexpensive means for solving the above-mentioned difficulties.

A further object of the present invention is to provide an insulator stud, useful, for example, between a motor casing and a motor brush holder, which has adequate properties of high mechanical tensile, cantilever, and shear strengths and good electrical properties.

Another object of the present invention is to provide a stand-off insulator stud wherein the tensile strength of the article is independent of a cast or molded material which forms a portion thereof.

In accordance with our invention in one aspect thereof, we eliminate the shear stresses and the hot molded plastic material of the prior art type of insulator stud by using a pair of metallic members which have radial projections on the inner ends thereof. These members are placed in axial alignment with these inner ends separated by a preformed insulating spacer, after which the metallic members are tied together by a binding material of insulating cord, such as glass thread, entwined around and interlacing the radial projections, and after this step an insulating compound comprising a cold setting resin is cold molded around the preformed insulating spacer, around the inner ends of the metallic members, around the projections, and around the binding material.

Figure 1:
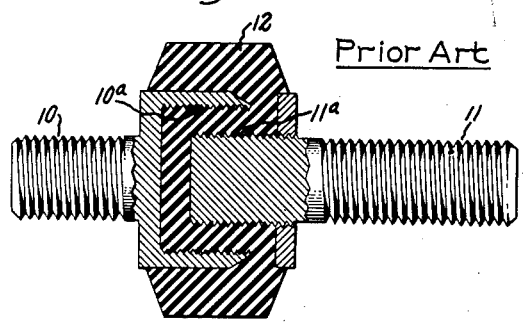
Figure 2:
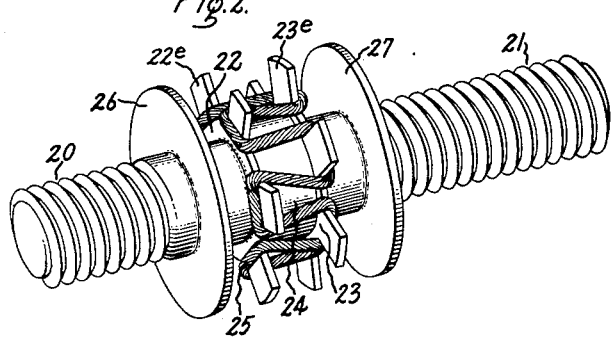

The features of our invention which we believe to be novel are set forth with particularity in the appended claims. Our invention itself, however, both as to its organization and advantages, may best be understood by reference to the following description taken in connection with the accompanying drawing in which Fig. 1 is a representation, partially in section, of a brushholder, insulating stud of the prior art; Fig. 2 is a perspective view of a brushholder insulating stud constructed in accordance with our invention and shown during one step of its manufacture; and Fig. 3 is an elevational view, partially in section, of the brushholder stud of the invention in its completed form.

Referring now to Fig. 1, showing a prior art brushholder insulating stud, 10 and 11 represent threaded metallic members of different lengths. It is often conventional to threadedly engage the shorter member 10 with a portion of a motor or generator frame and use the longer threaded member 11 as a support for a brushholder bolted thereto. Also in accordance with conventional practice, one of the members, 11 in the drawing, is provided with an externally threaded inner end 11a and the other member is provided with an inner end 10a which is internally threaded and a hot molded insulation 12 is molded around the entire inner end assembly of the two members and between the internal threads of 10a and the external threads at 11a to form an insulating bond about and between these members. As already pointed out, a primary difficulty encountered in such a construction arises because of the fact that it is difficult to hold the parts in axial alignment during the hot molding process, and because the entire assembly is dependent upon the strength of the plastic material 12. In the past it has appeared to be necessary to hot mold the plastic since it seemed apparent that a cold molded plastic would lack the required strength. As a result, further disadvantageous results have occurred because the high heat of molding generally caused the outwardly extending threaded portions of 10 and 11 to oxidize so that they required subsequent machining and plating. Such plating and machining are expensive and proper plating is difficult inasmuch as the the plating must not surround the insulation material 12 and thereby short-circuit the two metallic members.

Referring now to Fig. 2, 20 and 21 represent a pair of metallic stud members which are provided with external threads at their outer ends and which at their inner ends are provided with disks or flanges 22 and 23, respectively. These disks may be formed integral with the respective stud members or may be brazed or otherwise secured thereto and each of the disks, 22 and 23, is provided with outwardly extending radial projections or ears 22e and 23e, respectively. During manufacture the threaded metallic members are placed in axial alignment and a preformed insulating spacer 24 is placed between the flanged disks at their inner ends and then the members are bound together against the insulating spacer 24 by entwining the projections 22e and 23e with a lacing 25 of insulating material such as threads of glass, nylon, cotton, hemp, or any other natural or synthetic insulating cord. The preformed spacer 24 may be made of any one of a wide variety of materials such as a laminated or molded phenolic made with cotton cloth or glass cloth or mat, or be made of paper sheet or pulp, wood or asbestos flour, or of any other insulating material of sufficient compressive strength to meet the requirements. If desired metallic terminal plates 26 and 27 may be provided on the respective metallic members axially spaced from the end disks (22 and 23) thereof.

Figure 3:
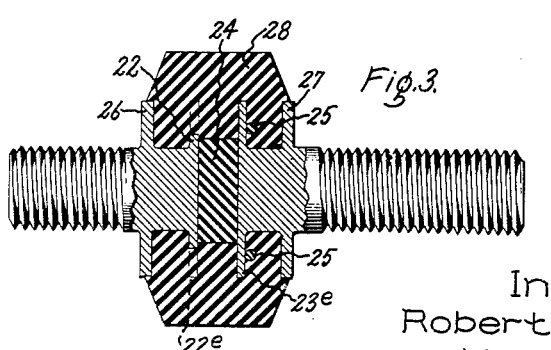

After the disks are bound tightly together with the aforementioned spacer between their ends, the assembly of Fig. 2 is then placed in a mould form (not shown) and cast to its ultimate shape, indicated in Fig. 3, using a cold setting polyester resin, unfilled or filled with pigments or other organic or inorganic filling materials. This cold setting plastic material is indicated at 28 in Fig. 3, and one advantage of the construction is that the tensile and cantilever shear strength are controlled not by the material of molding but rather by the selection of material for the binding cord. By varying the number of turns and composition of the material used in binding the parts together, the tensile strength and cantilever shear can be varied to meet requirements, and by proper choice of material and control of thickness of spacer block, the dielectric and other electrical constants can be varied, also to meet requirements.

There is thus provided a device of the character described capable of meeting the objects hereinabove set forth. The insulator stud of the invention is characterized by accurate dimensions and axial alignment of the metallic members thereof as well as by simplicity of construction and the high strength already referred to. The total tensile strength is completely independent of the molding material and, to some extent, this is also true of the electrical properties of the finished product. With the construction of Figs. 2 and 3, furthermore, it is not necessary to remachine and replate the metallic parts after molding as was usually the case with conventional constructions such as that of Fig. 1.

Our invention is not to be limited to a case where externally threaded stud members are provided with projections for accommodating the interlacing for obviously the invention also includes a construction where internally threaded members are so used and laced together and adapted to accommodate external threads on a pair of separate stud members. While we have illustrated and described a particular embodiment of our invention, modifications thereof will occur to those skilled in the art. We, therefore, desire it to be understood that our invention is not to be limited to arrangements disclosed and we intend in the appended claims to cover all modifications which do not depart from the true spirit and scope of our invention.

What we claim as new and desire to secure by Letters Patent of the United States is:

1. A stand-off insulator stud comprising a pair of axially aligned annular threaded metallic members, each of said members terminating at the inner end thereof in a disk having radially outwardly extending projections, a preformed insulating member arranged between the inner ends of said disks, a binding cord laced about said projections to hold said metallic members together with said preformed insulating spacer interposed therebetween, and a plastic material extending around inner end portions of said metallic members, around said projections, around said preformed insulating spacer, and around said binding cord.

2. An insulator stud for use between a motor casing and a motor brushholder and comprising a pair of annular externally threaded metallic members in substantially axial alignment, each of said members having at the axially inner end thereof a disk provided with radially outwardly extending projections, an insulating spacer between said disks, a binding cord laced around said projections to hold said metallic members together with said insulating spacer interposed therebetween, and a plastic resin cold molded material extending around said spacer, around said disks and the projections thereof, around said binding cord and around an inner end portion of each of said threaded metallic members.

ROBERT E. MUNGOVAN.
HOWARD W. ORR.

REFERENCES CITED

The following references are of record in the file of this patent:

UNITED STATES PATENTS

| Number | Name | Date |
| --- | --- | --- |
| 515,779 | Luscomb | Mar. 6, 1894 |
| 1,004,795 | Lachman | Oct. 3, 1911 |
| 2,005,897 | Knowles | June 25, 1935 |
| 2,149,827 | Andre | Mar. 7, 1939 |